US007884523B2

(12) United States Patent
Horng et al.

(10) Patent No.: US 7,884,523 B2
(45) Date of Patent: Feb. 8, 2011

(54) BRUSHLESS DC MOTOR (75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 280 days.

(21) Appl. No.: 12/174,669

(22) Filed: Jul. 17, 2008

(65) Prior Publication Data
US 2009/0295254 A1 Dec. 3, 2009

(30) Foreign Application Priority Data
Jun. 3, 2008 (TW) .............................. 97120586 A (51) Int. Cl.
*H02K 1/12* (2006.01)
(52) U.S. Cl. ................... 310/256; 310/156.32; 310/268
(58) Field of Classification Search ................. 310/256, 310/156.32, 156.33, 156.34, 268, 67 R
See application file for complete search history.

(56) References Cited

U.S. PATENT DOCUMENTS

| 1,689,188 | A | * | 10/1928 | Pohl et al. .................... 310/256 |
| 4,205,247 | A | * | 5/1980 | Brammerlo .................. 310/256 |
| 4,499,391 | A | * | 2/1985 | Sakamoto ..................... 310/89 |
| 4,519,010 | A | * | 5/1985 | Elsaesser et al. ......... 360/99.08 |
| 5,217,351 | A |  | 6/1993 | Meier et al. |
| 5,694,268 | A | * | 12/1997 | Dunfield et al. .......... 360/98.07 |
| 5,875,069 | A | * | 2/1999 | Suzuki et al. ............. 360/99.04 |
| 2005/0063817 | A1 | * | 3/2005 | Park ........................ 415/170.1 |
| 2005/0140241 | A1 | * | 6/2005 | Petersen ..................... 310/216 |
| 2007/0176508 | A1 | * | 8/2007 | Kasai et al. ............ 310/156.32 |
| 2008/0130169 | A1 |  | 6/2008 | Kitamura |

FOREIGN PATENT DOCUMENTS

JP 61092154 A * 5/1986
TW 94140896 11/2005

* cited by examiner

*Primary Examiner*—Quyen Leung
*Assistant Examiner*—Alex W Mok
(74) *Attorney, Agent, or Firm*—Alan Kamrath; Kamrath & Associates PA (57) ABSTRACT A brushless DC motor includes a base, a stator, a rotor, and a leak flux absorber. The base couples with the rotor. The stator has a coil module and is mounted on the base. The rotor has a shaft and a permanent magnet, with the rotor coupling with the base through the shaft. A gap is axially formed between the permanent magnet and the coil module. Also, the leak flux absorber is disposed around the coil module and is adjacent to, partially in, or totally in the gap. Consequently, a leak flux generated by the permanent magnet, which does not pass through the coil module, is absorbed by the leak flux absorber and forms close magnetic flux paths, so that high-frequency noise in operation is thus lowered.

11 Claims, 12 Drawing Sheets

BRUSHLESS DC MOTOR

BACKGROUND OF THE INVENTION

1. Field of the Invention

The present invention relates to a motor and, more particularly, to a brushless DC motor.

2. Description of the Related Art

A conventional brushless DC motor disclosed in U.S. Pat. No. 5,217,351 titled as "Small Fan" is well known. The disclosed brushless DC motor includes a housing and an impeller. The housing has a base providing an axial tube and holding two coils, with the axial tube receiving a bearing inside and the coils being in plate shapes. The impeller has a bowl-shaped hub, a plurality of blades arranged on an outer surface of the hub with equal intervals and expanding in radial directions about the hub, a shaft extending between the hub and the base with two ends of the shaft respectively coupling with a center point inside the hub and the bearing of the axial tube, and an annular magnet also in a plate shape combined inside the hub. The annular magnet can thereby be driven by alternating magnetic fields created by the coils when currents flow through the coils. Thus, the impeller revolves.

However, because the hub and blades of said conventional brushless DC motor are generally produced by injection molding, reduction in axial size of the hub is limited, and the size of the conventional brushless DC motor is, therefore, impossible to be further decreased.

Figure 1:
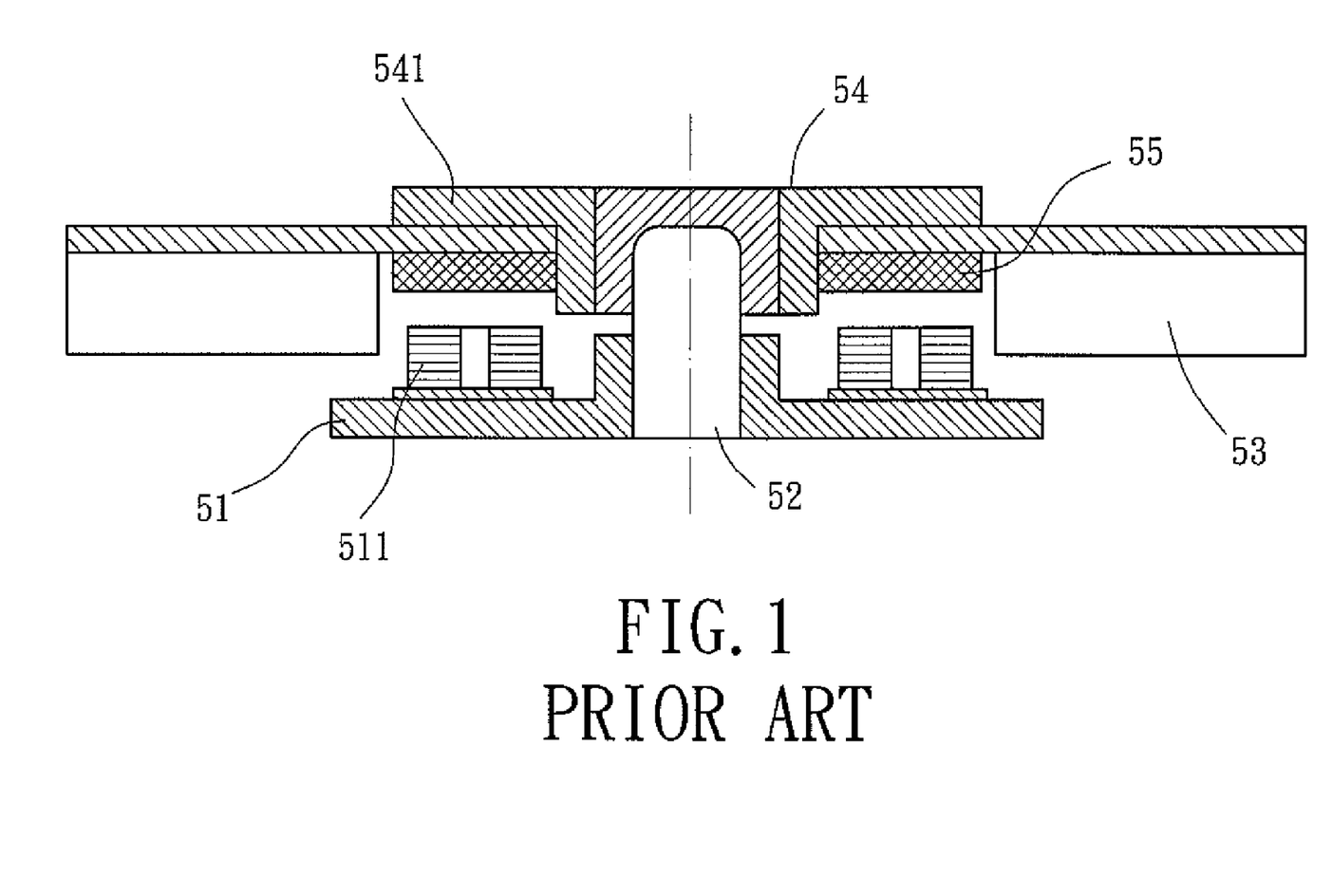
FIG. 1 is a cross-sectional side view illustrating a conventional brushless DC motor.
Figure 2:
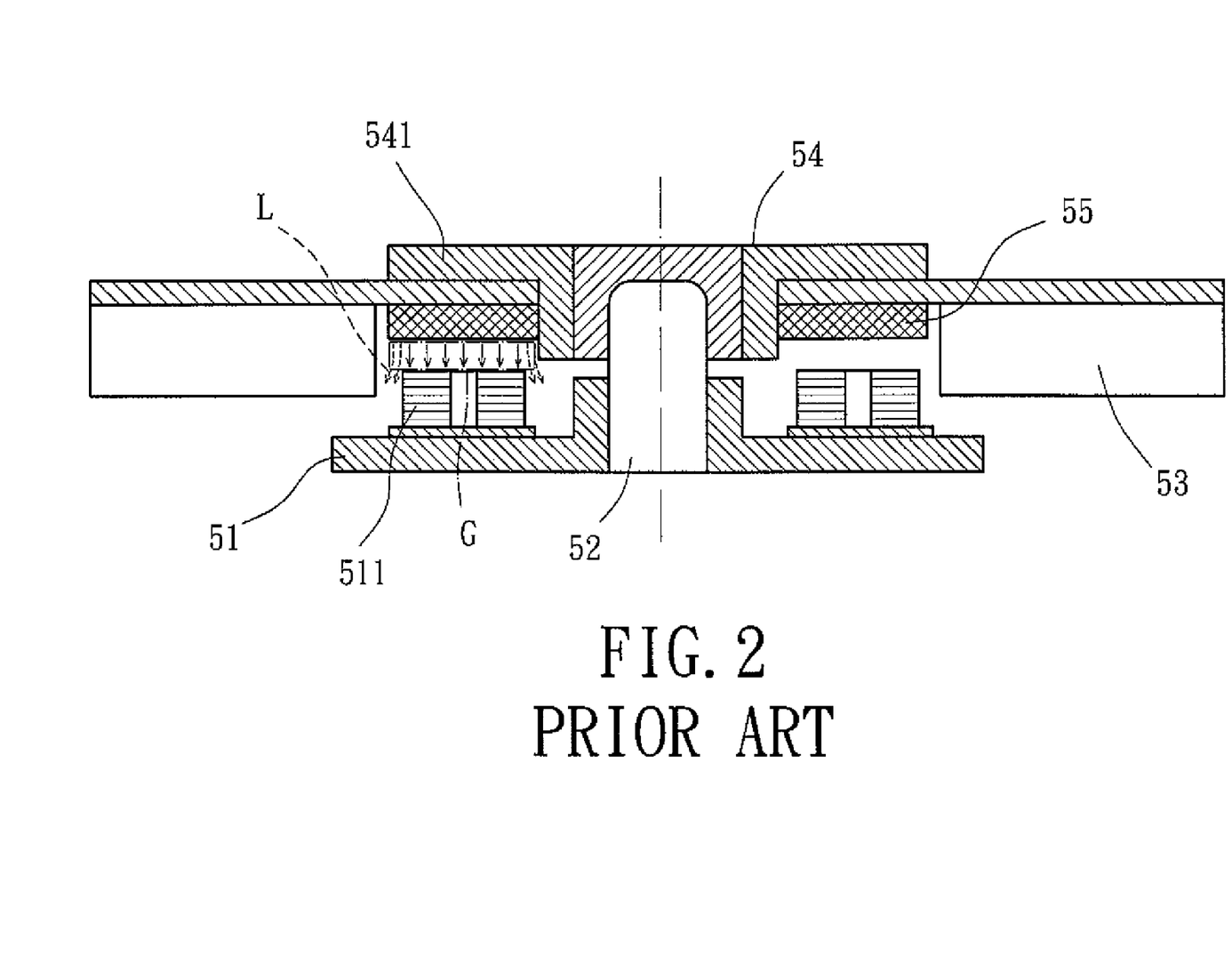
FIG. 2 is a cross-sectional side view illustrating the conventional brushless DC motor with flux.

In order to provide a brushless DC motor with smaller axial size, another conventional brushless DC motor is proposed, which is disclosed in a Taiwan patent application number 94140896, titled as "Thin Fan" and shown in FIGS. 1 and 2. Referring to FIG. 1, the conventional DC motor comprises a base 51, a shaft 52, a blade member 53, a coupling member 54, and a magnet-plate 55. The base 51 provides a plurality of coils 511. The two ended shaft 52 mounts on the base 51 with one end and mounts on the coupling member 54 with the other end. The coupling member 54 has a radial protrusion 541 for the blade member 53 to be firmly sandwiched between the radial protrusion 541 and the magnet-plate 55. Now referring to FIG. 2, there is a gap, indicated as "G", between the magnet-plate 55 and the coils 511 to let flux generated by the magnet-plate 55 pass through the coils 511 for flux linkage. Therefore, when currents flow through the coils 511 for the coils 511 to generate opposite magnetic field directions, the magnet-plate 55 and the blade member 53 are turned. By said structure of the conventional brushless DC motor, the size of the DC motor is decreased.

However, in operation of the DC motor, a part of the flux generated by the magnet-plate 55, which is identified as leak flux and indicated as "L", does not pass through the coils 511. Also said leak flux "L" and the coils 511 may induce high-frequency resonance easily, which can further induce high-frequency noise. Accordingly, there is a need for redesigning the conventional brushless DC motor.

SUMMARY OF THE INVENTION

The primary objective of this invention is to provide a brushless DC motor having a leak flux absorber around a coil module for reducing high-frequency noise in operation. Accordingly, the quality of operation is raised.

The secondary objective of this invention is to provide the brushless DC motor with the leak flux absorber including an outward ring and a flange formed at a bottom end of the outer ring, so as to provide a large area for the leak flux absorber to firmly mount on the stator. Accordingly, a steady assemblage of the brushless DC motor is provided.

Another objective of this invention is to provide the brushless DC motor with the leak flux absorber including merely a ring, so as to provide the leak flux absorber with a simplified structure. Accordingly, a low cost for manufacturing and utilizing the leak flux absorber is provided.

Another objective of this invention is to provide the brushless DC motor with the leak flux absorber in a plate shape to reduce the axial size of the leak flux absorber. Accordingly, the brushless DC motor can be designed in small size.

The brushless DC motor in accordance with an aspect of the present invention includes a base, a stator, a rotor, and a leak flux absorber. The base has a shaft seat. The stator has a coil module disposed on the base. The rotor includes a body providing an inner surface opposite to the coil module of the stator, a permanent magnet mounting on the inner surface of the body, and a shaft coupling with a center of the inner surface with one end and revolvably connecting to the shaft seat with another end. A gap is axially formed between the permanent magnet and the coil module. Also, the leak flux absorber is disposed around the coil module and is adjacent to, partially in, or totally in the gap. Consequently, a leak flux generated by the permanent magnet, which does not pass through the coil module, is absorbed by the leak flux absorber and forms close magnetic flux paths, so that high-frequency noise in operation is lowered.

In a separate aspect of the present invention, the leak flux absorber comprises an outer ring and an inner ring. A plurality of connecting members links the outer and inner rings, while a plurality of through holes is arranged between said outer and inner rings, with each through hole being arranged between any adjacent two of the connecting members. Besides, the outer ring encloses the coil module, while the inner ring is surrounded by the coil module. Also, a plurality of end faces of the coil module faces the permanent magnet through the through holes.

In another separate aspect of the present invention, the leak flux absorber merely has a ring enclosing the coil module.

In another separate aspect of the present invention, the leak flux absorber has a ring plate, a plurality of connecting plates extending outwardly in radial directions of the ring plate from an outer periphery thereof, and plural outer plates respectively formed at free ends of the connecting plates. The ring plate mounting on the coil module and the outer plates jointly surround the coil module.

Further scope of the applicability of the present invention will become apparent from the detailed description given hereinafter in connection with drawings. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinafter, and the accompanying drawings that are given by way of illustration only are not limitations of the present invention, wherein.

In the various figures of the drawings, the same numerals designate the same or similar parts. Furthermore, when the terms "first", "second", "third", "end", "top", "bottom", "axial", "radial", "lateral", "outward", "inward" and similar terms have used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 3:
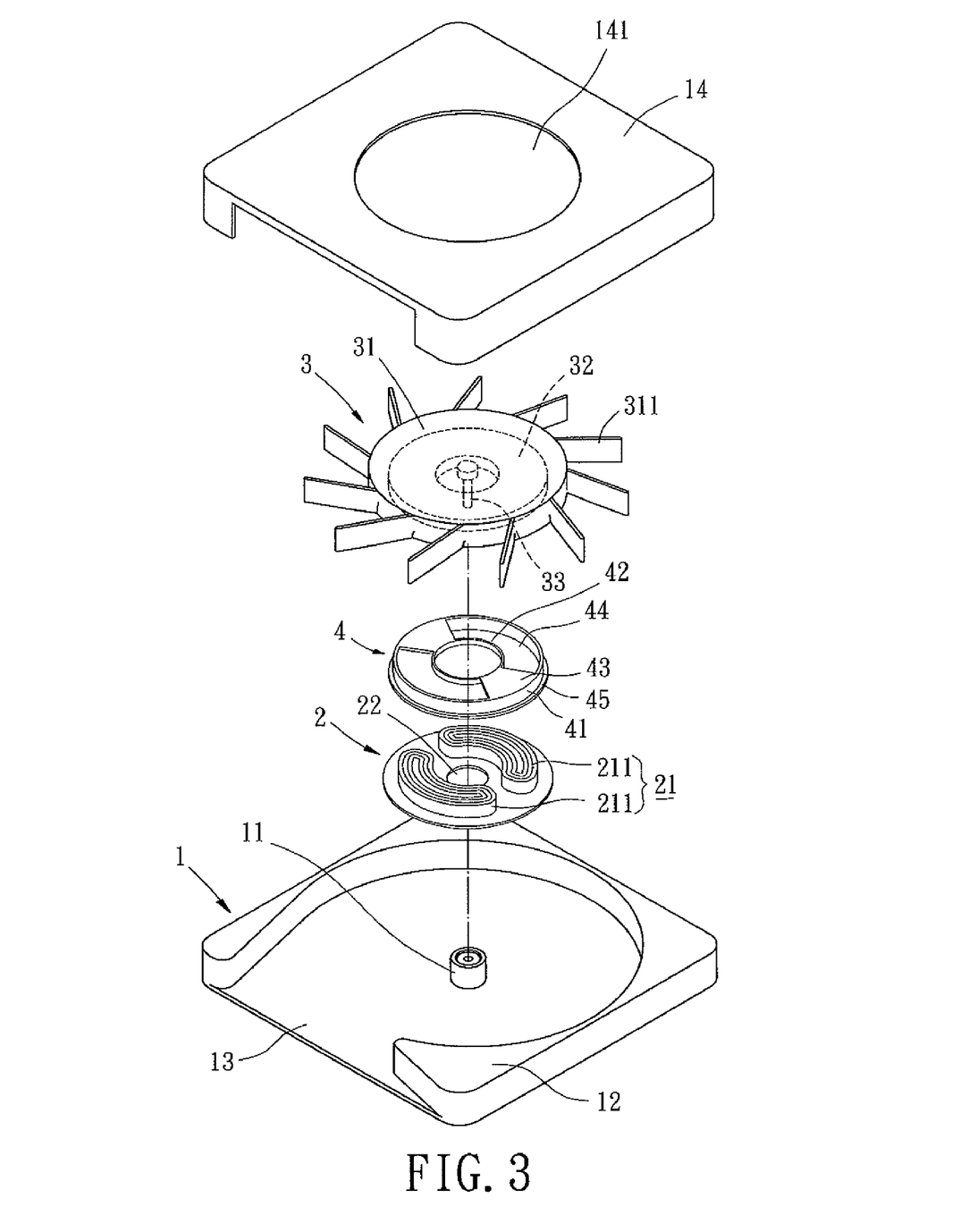
FIG. 3 is an exploded perspective view illustrating a brushless DC motor in accordance with a first embodiment of the present invention.
Figure 4:
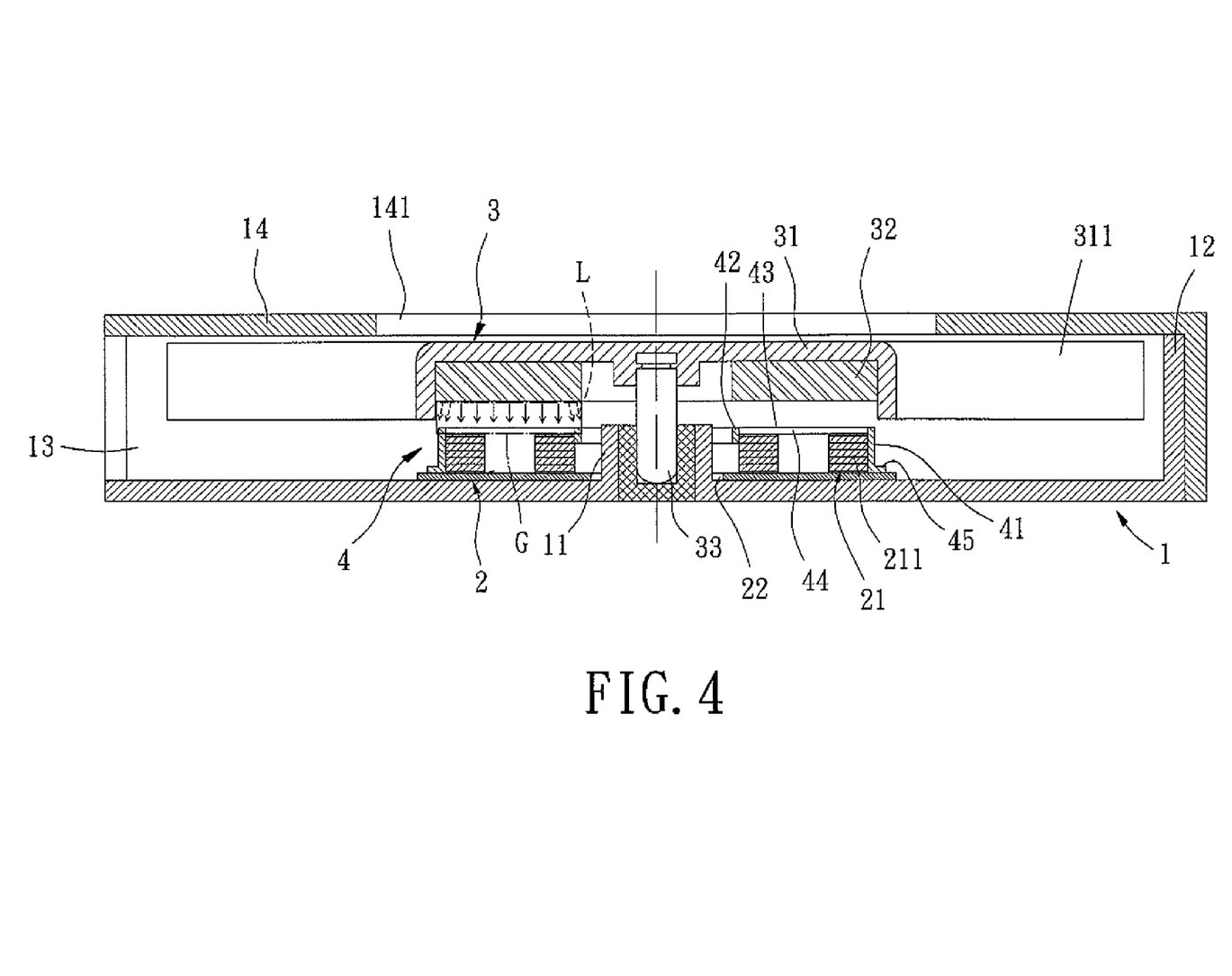
FIG. 4 is a cross-sectional side view illustrating the brushless DC motor in accordance with the first embodiment of the present invention.

Referring now to FIGS. 3 and 4, a brushless DC motor according to a first embodiment of the present invention is illustrated, which comprises a base 1, a stator 2, a rotor 3, and a leak flux absorber 4. The base 1 provides a shaft seat 11, preferably in a tube shape, with a bearing disposed inside the shaft seat 11 for the rotor 3 to revolvably couple with the shaft seat 11. Besides, a lateral wall 12 is preferably formed around the shaft seat 11 and at edges of the base 1 to form a cavity for receiving the stator 2, rotor 3, and leak flux absorber 4. A part of the lateral wall 12 forms an air outlet 13. A cover 14 is further provided to combine with a free end of the lateral wall 12 for covering the cavity, and the cover 14 has an air inlet 141 for air to flow into the cavity. With the above-mentioned structure, the base 1 can be applied as a housing of a fan.

Figure 7:
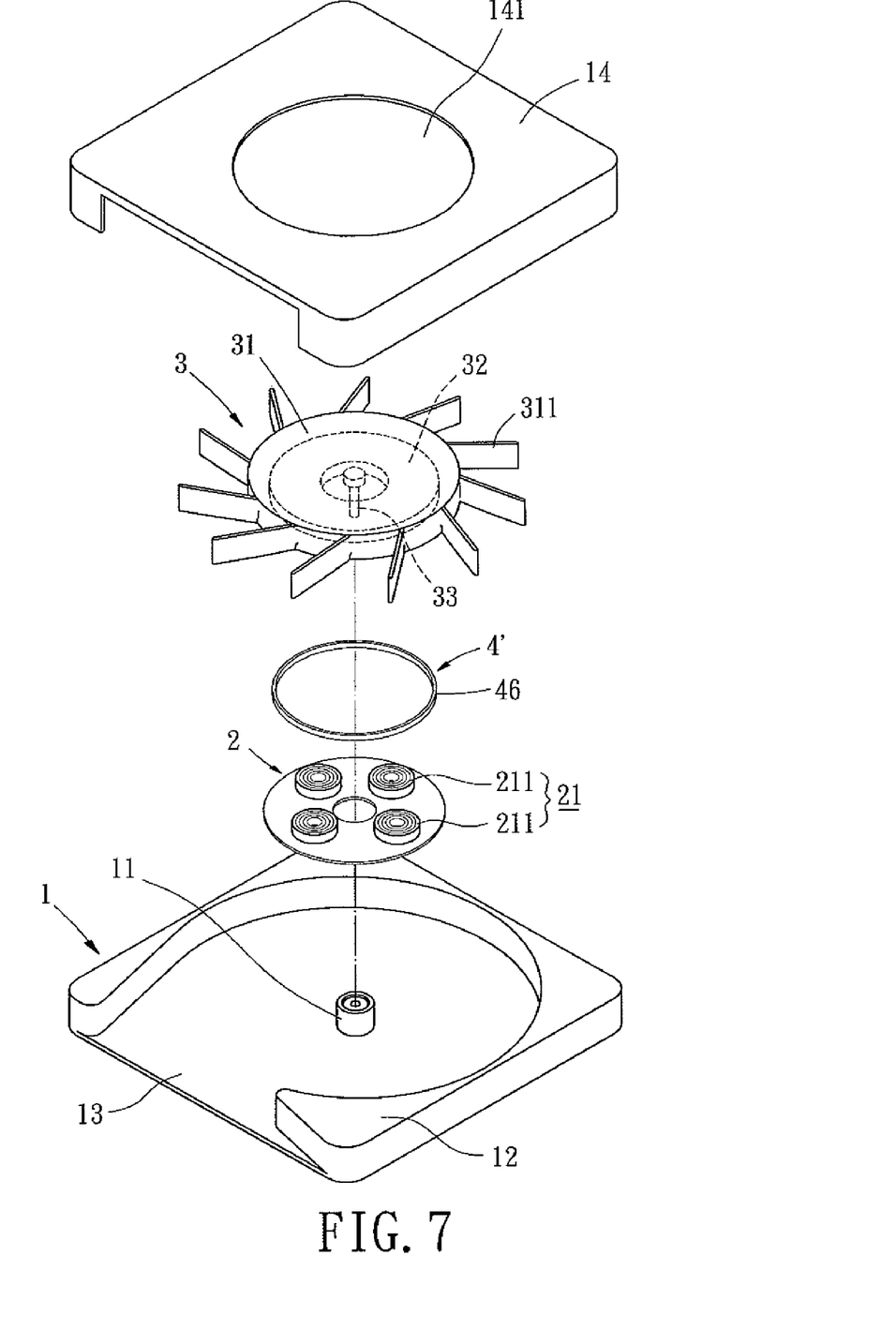
FIG. 7 is an exploded perspective view illustrating a brushless DC motor in accordance with a second embodiment of the present invention.
Figure 10:
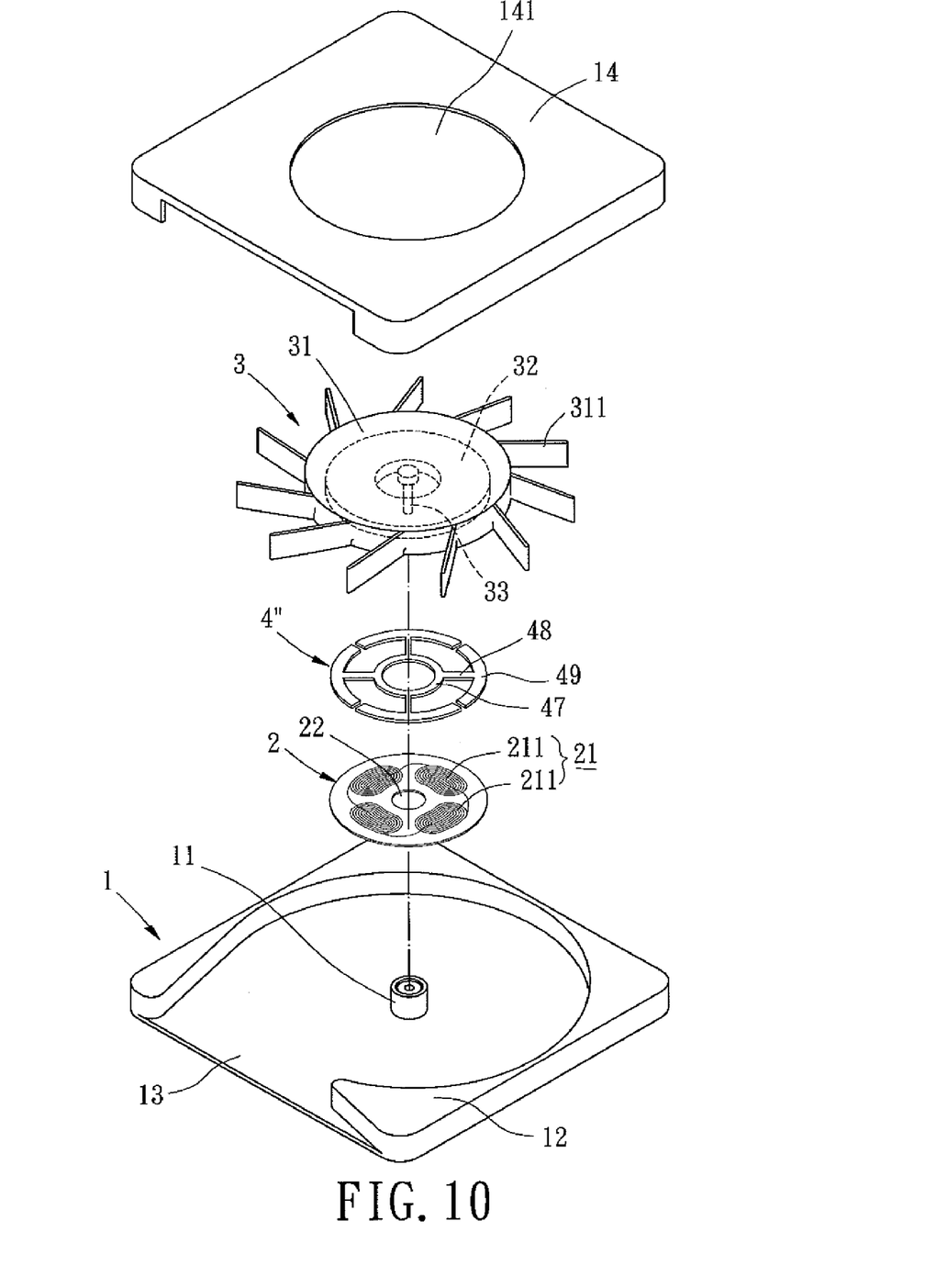
FIG. 10 is an exploded perspective view illustrating a brushless DC motor in accordance with a third embodiment of the present invention.

The stator 2 has a coil module 21 and an axial hole 22 and is disposed on the base 1. The shaft seat 11 of the base 1 extends through the axial hole 22, and the coil module 21 is arranged around the shaft seat 11. The coil module 21 has a plurality of coils 211 for generating magnetic fields of opposite magnetic directions when currents flow through the coils 211, with each coil 211 providing an end face facing the rotor 3 after the brushless DC motor is assembled. The amount of the coils 211 is preferably two as shown in FIG. 3 or four as shown in FIG. 7. Any adjacent two of the coils 211 generate magnetic fields of opposite magnetic directions. Besides, each of the coils 211 shown in FIG. 3 has an outer surface facing outwardly and an inner surface facing inwardly in radial directions of the axial hole 22. The coils 211 can also be conducting wires of a circuit board as shown in FIG. 10, so that the thickness of the coils 211, as well as that of the stator 2, is reduced. Moreover, each of the coils 211 shown in FIG. 10 has an outer edge facing outwardly and an inner edge facing inwardly in radial directions of the axial hole 22.

The rotor 3 includes a body 31, a permanent magnet 32, and a shaft 33. The body 31 provides a plurality of blades 311 on the periphery thereof, such that the rotor 3 can be applied as an impeller of a fan. Also, the body 31 has an inner surface that is opposite to the coil module 21 of the stator 2 when the rotor 3 and stator 2 are assembled. The permanent magnet 32 mounts on the inner surface of the body 31 and faces the end faces of the coils 211. The two-ended shaft 33 couples with a center of the inner surface of the body 31 with one end and revolvably connects to the shaft seat 11 of the base 1 with the other end. Through the above-mentioned base 1, stator 2, and rotor 3, the stator 2 is sandwiched between the base 1 and the rotor 3 when the rotor 3 is coupled with the base 1. Thus, a gap "G" is axially formed between the permanent magnet 32 and the coil module 21.

As shown in FIG. 4, a part of the flux generated by the permanent magnet 32 passes through the gap "G" and the coils 211 for flux linkage. Therefore, when each coil 211 of the coil module 21 generates a magnetic field by a current flowing through the coil 211, magnetic interaction between the magnetic fields of the coils 211 and the permanent magnet 32 occurs. Thereby, the rotor 3 turns. However, there is still another part of the flux, so called leak flux "L", generated by the permanent magnet 32 and not passing through the coils 211.

Figure 5:
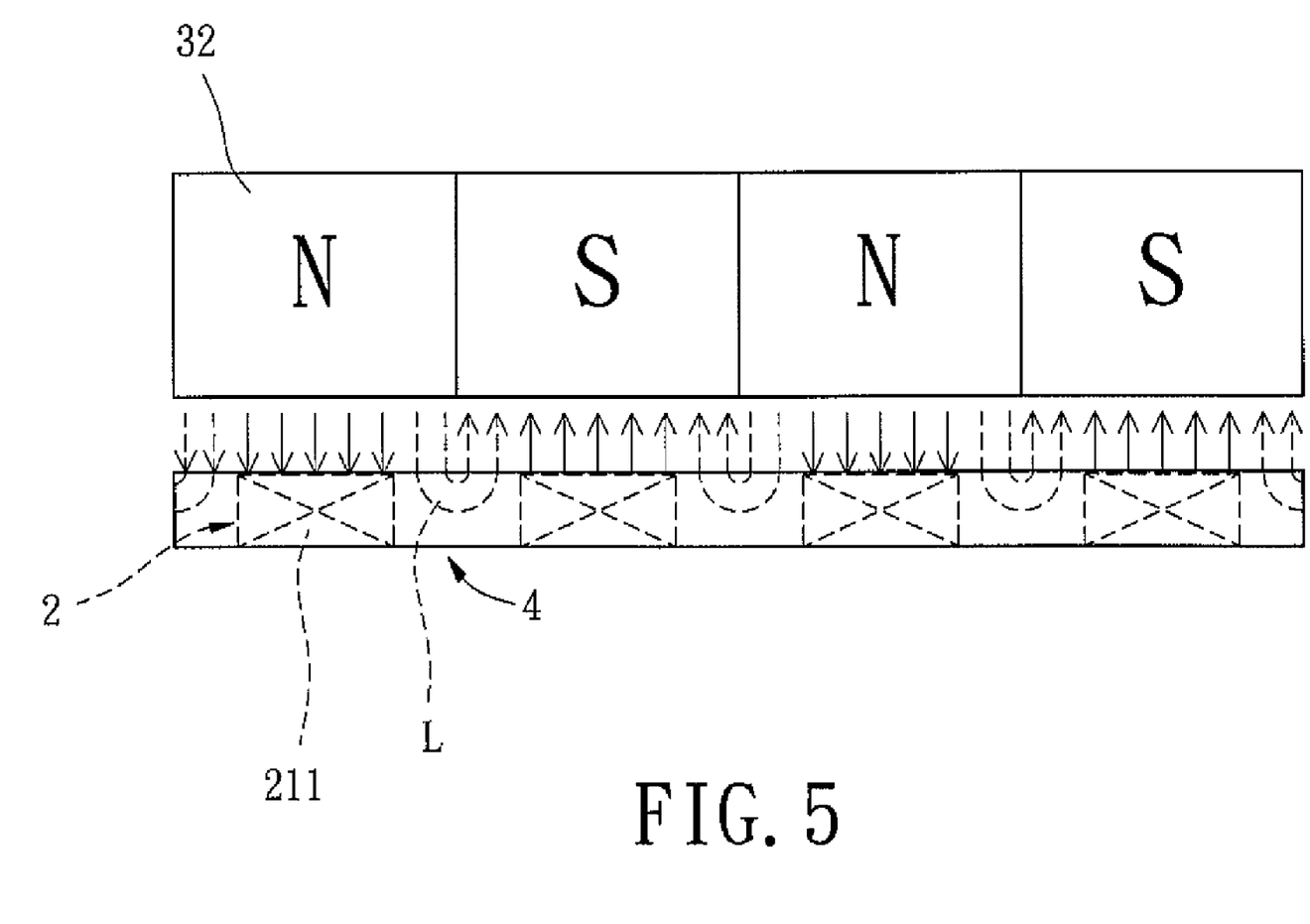
FIG. 5 illustrates flux between a permanent magnet and a leak flux absorber of the first embodiment of the present invention.

Therefore, by being made of magnetic conductive material and around the coil module 21, said leak flux absorber 4 is applied to lead the leak flux "L" back to the permanent magnet 32 to form close magnetic flux paths and thus avoid high-frequency resonance between the leak flux "L" and the coils 211. In detail, referring to FIG. 5, the leak flux "L" generated by each north pole "N" of the permanent magnet 32 is absorbed by the leak flux absorber 4, is led by the leak flux absorber 4, and, then, further flows back to an adjacent south pole "S" to form a close magnetic flux path. Consequently, when the rotor 3 turns, high-frequency noise induced by said high-frequency resonance is thereby lowered.

According to various designs of other components of the brushless DC motor, the leak flux absorber 4 can be shaped in the following forms for various embodiments of the present invention. However, a component in other shapes assembled in a brushless DC motor in the same way for the same purpose shall still be regarded as the leak flux absorber 4 of the present invention.

Please refer to FIGS. 3 and 4 again, which illustrate a first embodiment of the present invention. For the first embodiment, the leak flux absorber 4 includes an outer ring 41 and an inner ring 42. A plurality of connecting members 43 links the outer and inner rings 41, 42. A plurality of through holes 44 is arranged between the outer and inner rings 41, 42, with each through hole 44 being arranged between any adjacent two of the connecting members 43. Each of the outer and inner rings 41, 42 has a bottom end for connecting with the stator 2 and a top end facing the rotor 3 after the brushless DC motor of the present invention is assembled. Besides, a flange 45 is formed at the bottom end of the outer ring 41 and extends radially and outwardly.

Figure 6:
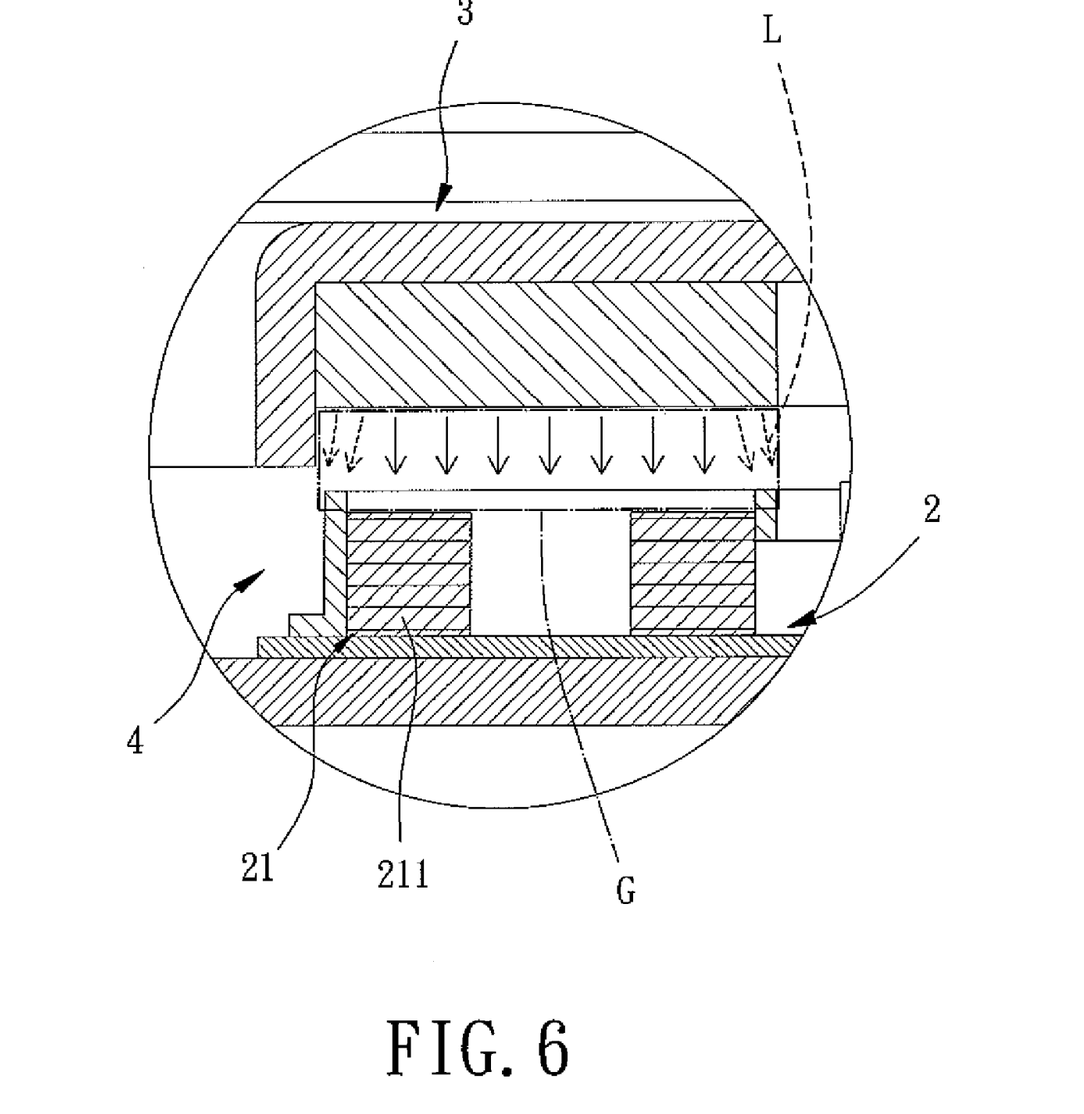
FIG. 6 is a detailed and cross-sectional side view illustrating the brushless DC motor in accordance with the first embodiment of the present invention.

When the leak flux absorber 4 couples with the stator 2, the outer ring 41 encloses the coil module 21 and is adjacent to, preferably abutting on, the outer surface of each coil 211, while the inner ring 42 is surrounded by the coil module 21 and adjacent to, preferably abutting on, the inner surface of each coil 211. Each of the connecting members 43 is arranged between any adjacent two of the coils 211 for the end faces of the coils 211 of the coil module 21 to face the permanent magnet 32 through the through holes 44. The flange 45 is applied to provide a large area for the leak flux absorber 4 to firmly mount on the stator 2. Moreover, the top edges of the outer and inner rings 41, 42 are arranged in the gap "G" as shown in FIG. 6 for effectively absorbing the leak flux "L" and avoiding forming the high-frequency resonance between the leak flux "L" and the coils 211.

Figure 8:
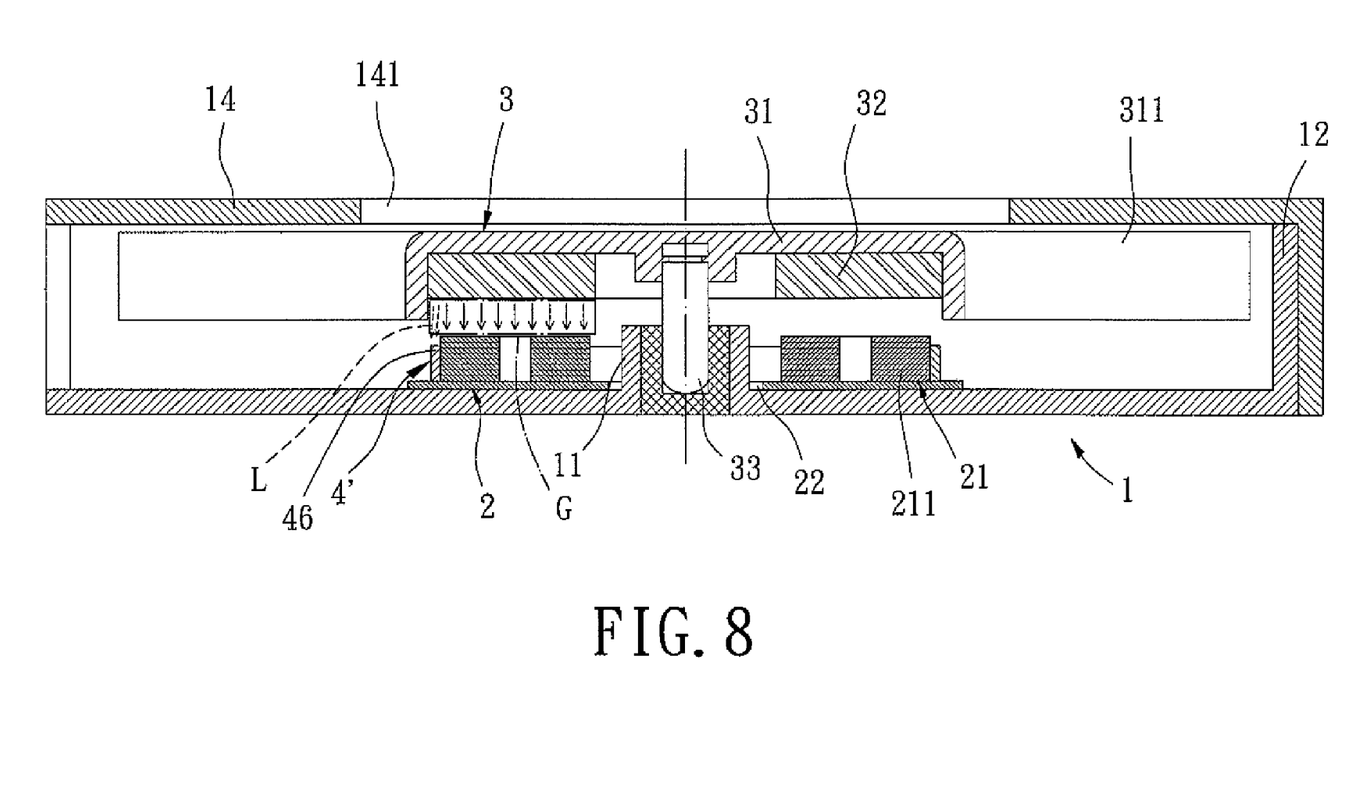
FIG. 8 is a cross-sectional side view illustrating the brushless DC motor in accordance with the second embodiment of the present invention.
Figure 9:
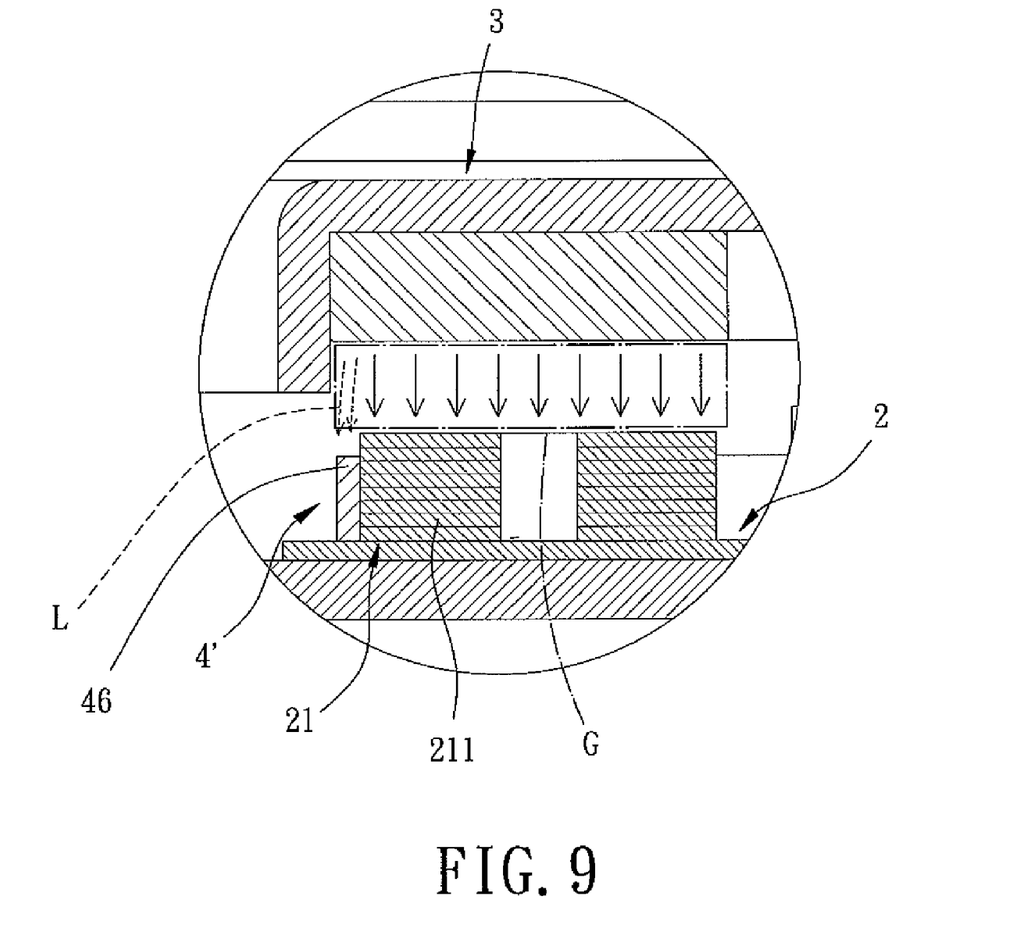
FIG. 9 is a detailed and cross-sectional side view illustrating the brushless DC motor in accordance with the second embodiment of the present invention.

Now referring to FIGS. 7 and 8, which illustrate a second embodiment of the present invention, instead of the leak flux absorber 4 having the outer and inner rings 41, 42, a leak flux absorber 4' in the form of a ring 46 with top and bottom edges is used to simplify the structure of the brushless DC motor. The ring 46 also encloses the coil module 21, with the top edge of the ring 46 being adjacent to the gap "G" as shown in FIG. 9 for the same purpose.

Figure 11:
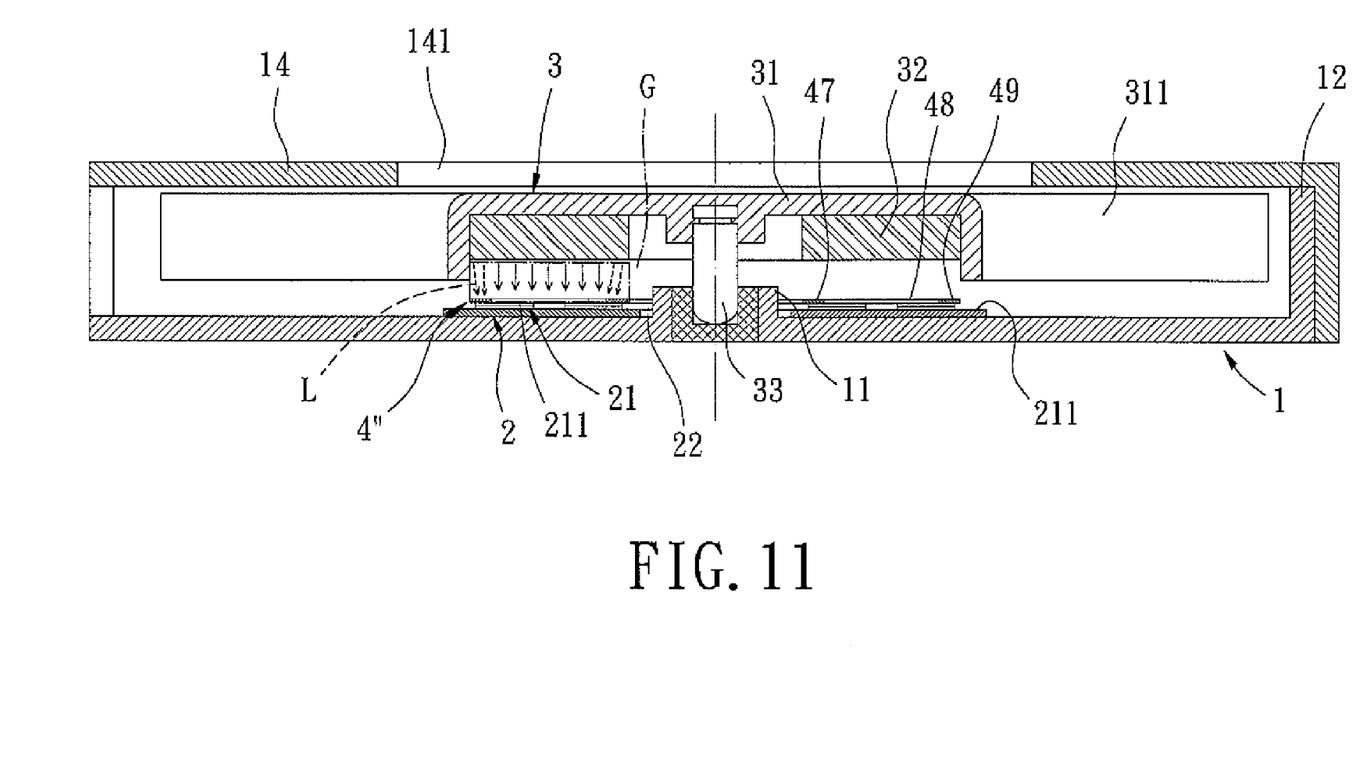
FIG. 11 is a cross-sectional side view illustrating the brushless DC motor in accordance with the third embodiment of the present invention.

Turning to FIGS. 10 and 11, which illustrate a third embodiment of the present invention, a leak flux absorber 4' for a brushless DC motor with the coils 211 being made of conducting wires of a circuit board is shown. The leak flux absorber 4" includes a ring plate 47, a plurality of connecting plates 48 extending outwardly in radial directions of the ring plate 47 from an outer periphery thereof, and plural outer plates 49 respectively formed at free ends of the connecting plates 48.

Figure 12:
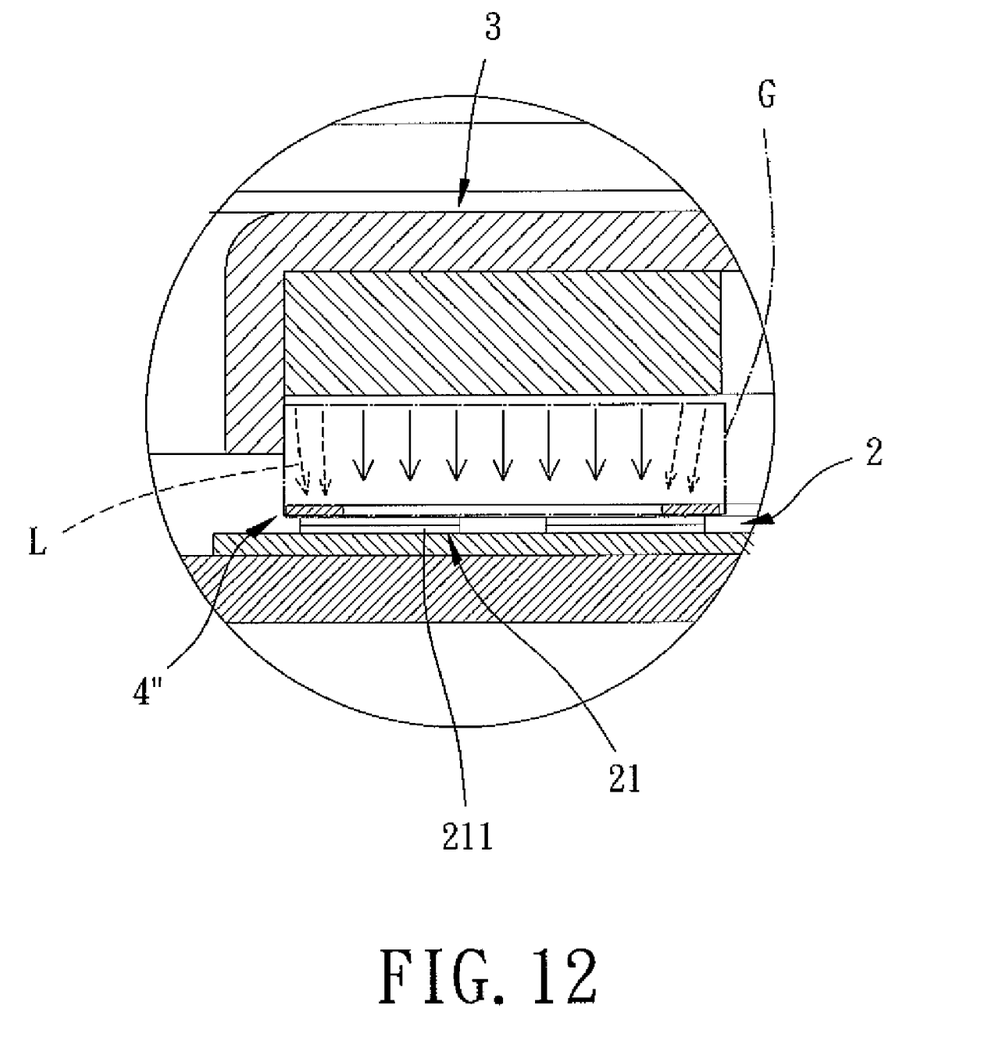
FIG. 12 is a detailed and cross-sectional side view illustrating the brushless DC motor in accordance with the third embodiment of the present invention.

When the leak flux absorber 4" couples with the stator 2, the ring plate 47 is mounted on the end faces of the coils 211 and adjacent to the inner edges thereof. Each of the connecting plates 48 is disposed between any adjacent two of the coils 211, and the outer plates 49 jointly surround the coil module 21 and are adjacent to the outer edges of the coils 211. Moreover, the outer plates 49 are preferably in arc shapes with an interval between any adjacent two of the outer plates 49. Each connecting plate 48 connects with a center point of each arc shape. As shown in FIG. 12, all the ring plate 47, connecting plates 48 and outer plates 49 are arranged in the gap "G" for effectively absorbing the leak flux "L" and avoiding forming of the high-frequency resonance between the leak flux "L" and the coils 211. Furthermore, with the plate-shaped ring plate 47, connecting plates 48 and outer plates 49, the thickness of the brushless DC motor of the present invention is further reduced.

In comparison with the conventional brushless DC motor, the brushless DC motor of the present invention can effectively direct the leak flux "L" back to the permanent magnet 32 to form close magnetic flux paths and to thus avoid high-frequency resonance between the leak flux "L" and the coils 211. As a result, when the brushless DC motor operates, high-frequency noise is largely lowered, and the quality of operation is raised.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A brushless DC motor comprising:
a base having a shaft seat;
a stator having a coil module disposed on the base;
a rotor comprising a body providing an inner surface opposite to the coil module of the stator, a permanent magnet mounting on the inner surface of the body, and a shaft coupling with a center of the inner surface with one end and revolvably connecting to the shaft seat with another end, with a gap being axially formed between the permanent magnet and the coil module; and
a leak flux absorber disposed around the coil module and adjacent to or partially in the gap, wherein the leak flux absorber comprises an outer ring and an inner ring, wherein a plurality of connecting members links the outer and inner rings while a plurality of through holes is arranged between said outer and inner rings, with each of the plurality of through holes being arranged between any adjacent two of the plurality of connecting members, with the outer ring enclosing the coil module and the inner ring being surrounded by the coil module, with a plurality of end faces of the coil module facing the permanent magnet through the plurality of through holes.

2. The brushless DC motor as defined in claim 1, wherein top edges of the outer and inner rings are arranged in the gap.

3. The brushless DC motor as defined in claim 1, wherein a flange is formed at a bottom end of the outer ring, extends radially and outwardly, and is mounted on the stator.

4. The brushless DC motor as defined in claim 1, wherein the coil module includes a plurality of coils.

5. The brushless DC motor as defined in claim 4, wherein the plurality of coils are conducting wires of a circuit board.

6. The brushless DC motor as defined in claim 1, wherein a lateral wall is formed at edges of the base, with a part of the lateral wall forming an air outlet; and wherein a cover having an air inlet combines with a free end of the lateral wall.

7. The brushless DC motor as defined in claim 6, wherein the body of the rotor provides a plurality of blades on the periphery thereof.

8. A brushless DC motor comprising:
a base having a shaft seat;
a stator having a coil module disposed on the base;
a rotor comprising a body providing an inner surface opposite to the coil module of the stator, a permanent magnet mounting on the inner surface of the body, and a shaft coupling with a center of the inner surface with one end and revolvably connecting to the shaft seat with another end, with a gap being axially formed between the permanent magnet and the coil module; and
a leak flux absorber being formed in plate shape and disposed around the coil module and in the gap, wherein the leak flux absorber has a ring plate, a plurality of connecting plates extending outwardly in radial directions of the ring plate from an outer periphery thereof, and plural outer plates respectively formed at free ends of the connecting plates, with the ring plate mounting on the coil module, and with the outer plates jointly surrounding the coil module.

9. The brushless DC motor as defined in claim 8, wherein the outer plates are in arc shapes with an interval between any adjacent two of the outer plates, with each connecting plate connecting with a center point of each arc shape.

10. The brushless DC motor as defined in claim 8, wherein the coil module includes a plurality of coils.

11. The brushless DC motor as defined in claim 10, wherein the plurality of coils are conducting wires of a circuit board.

* * * * *